United States Patent Office 3,494,388
Patented Feb. 10, 1970

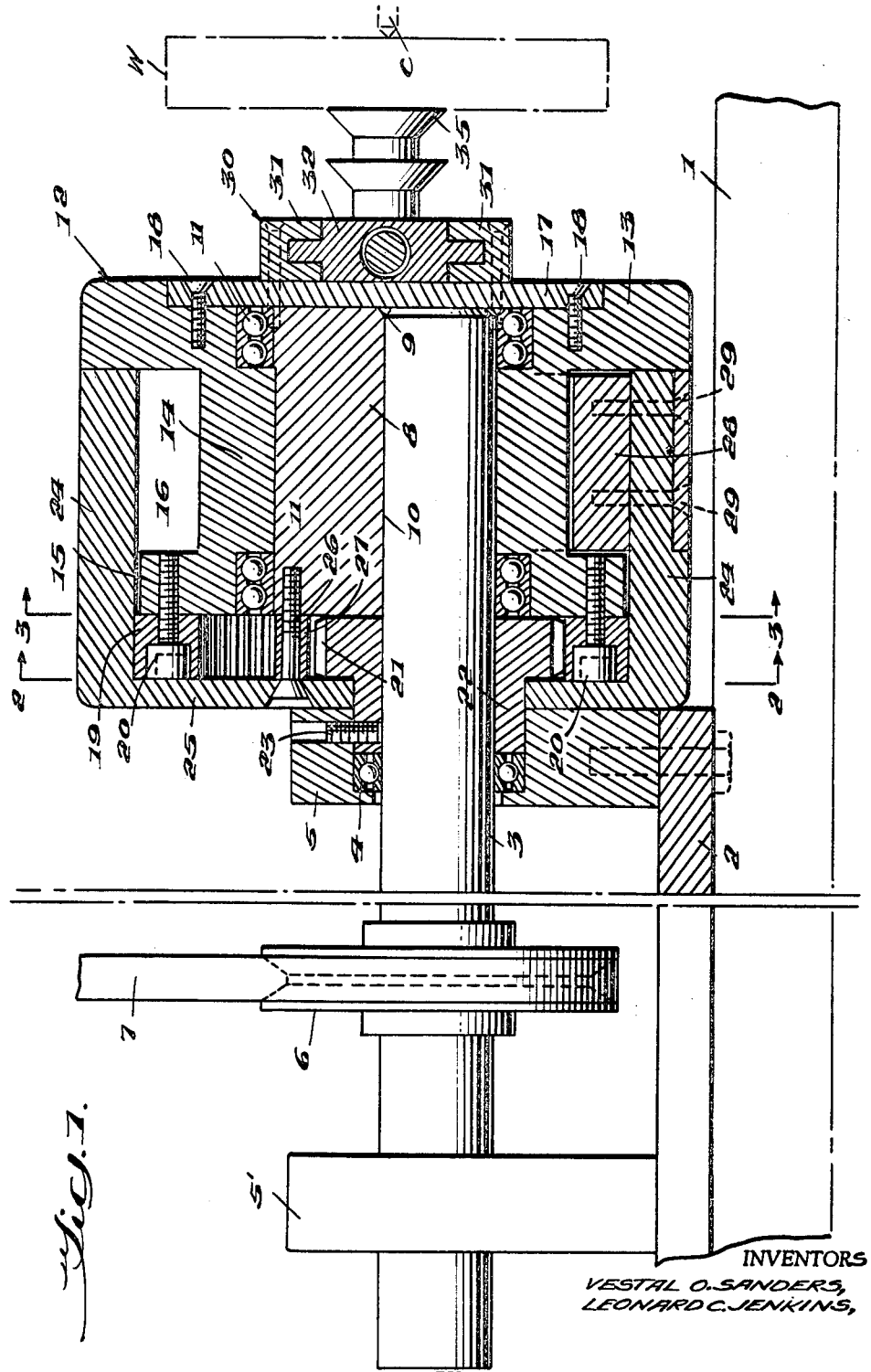

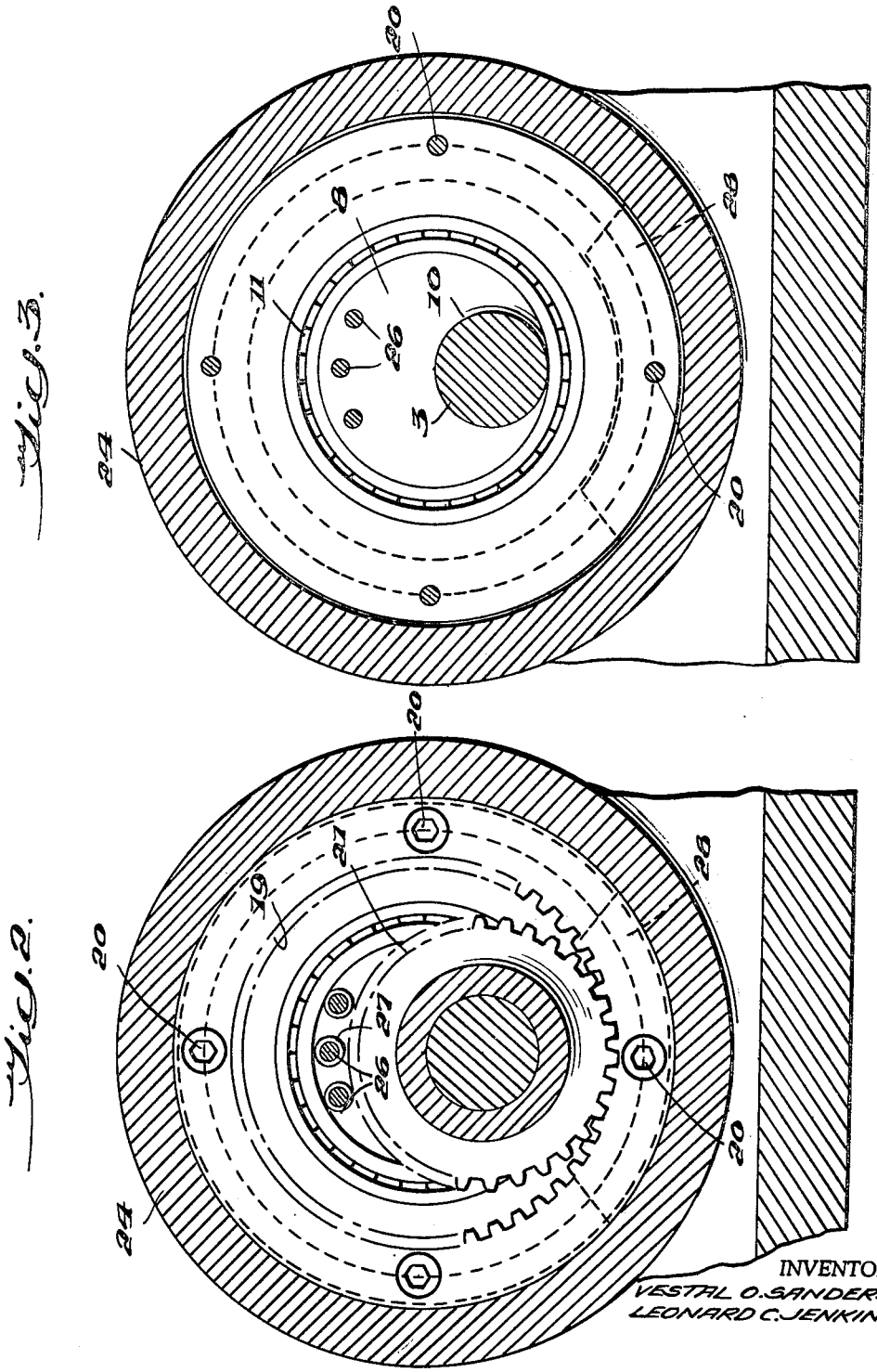

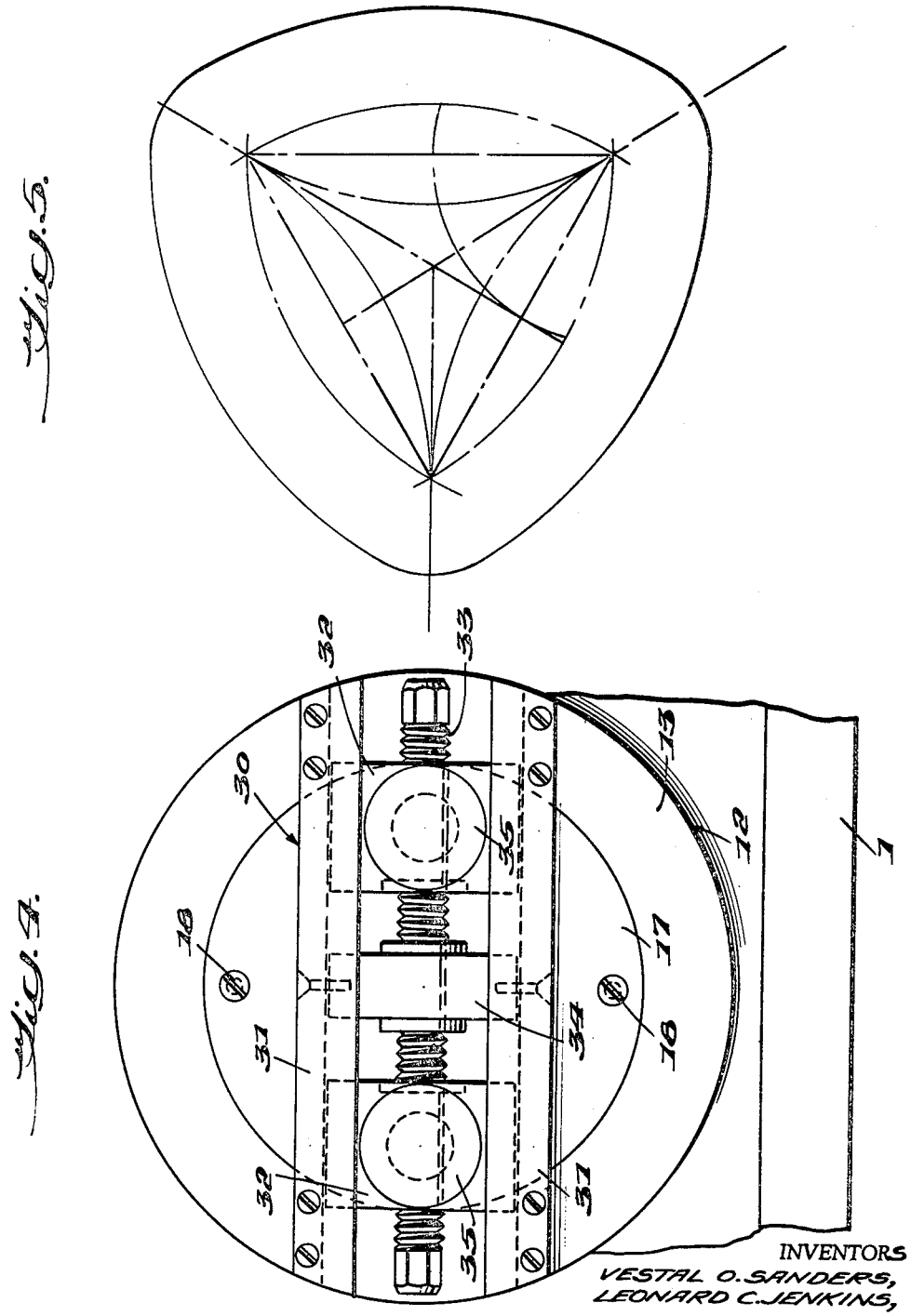

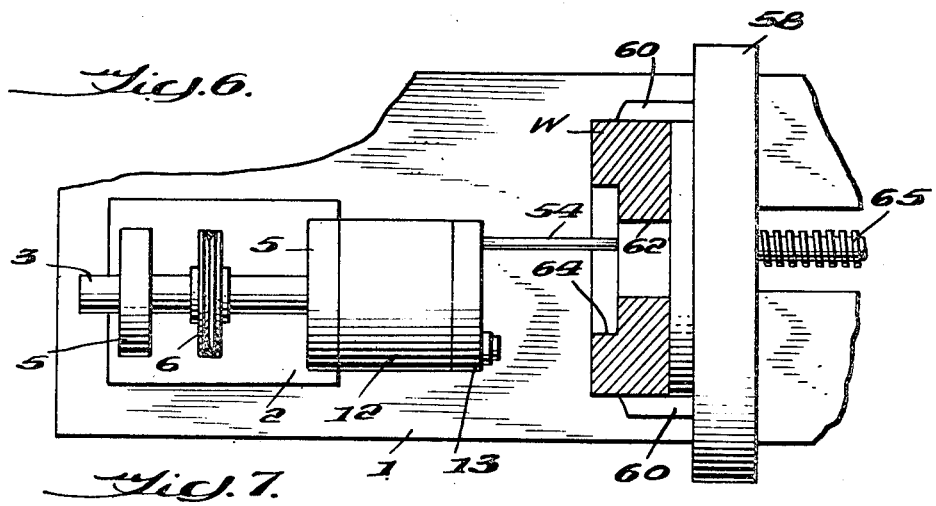
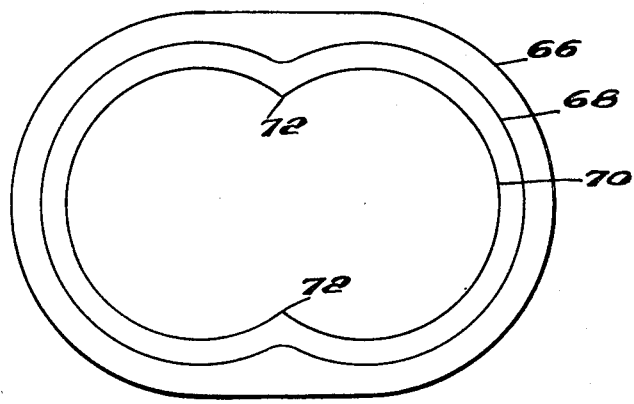
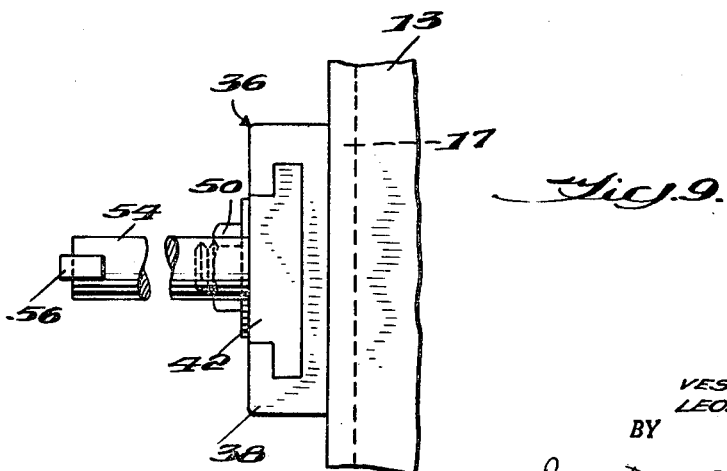
INVENTORS
VESTAL O. SANDERS,
LEONARD C. JENKINS,
BY
*Burns, Doane, Benedict, Swecker & Mathis*
ATTORNEYS

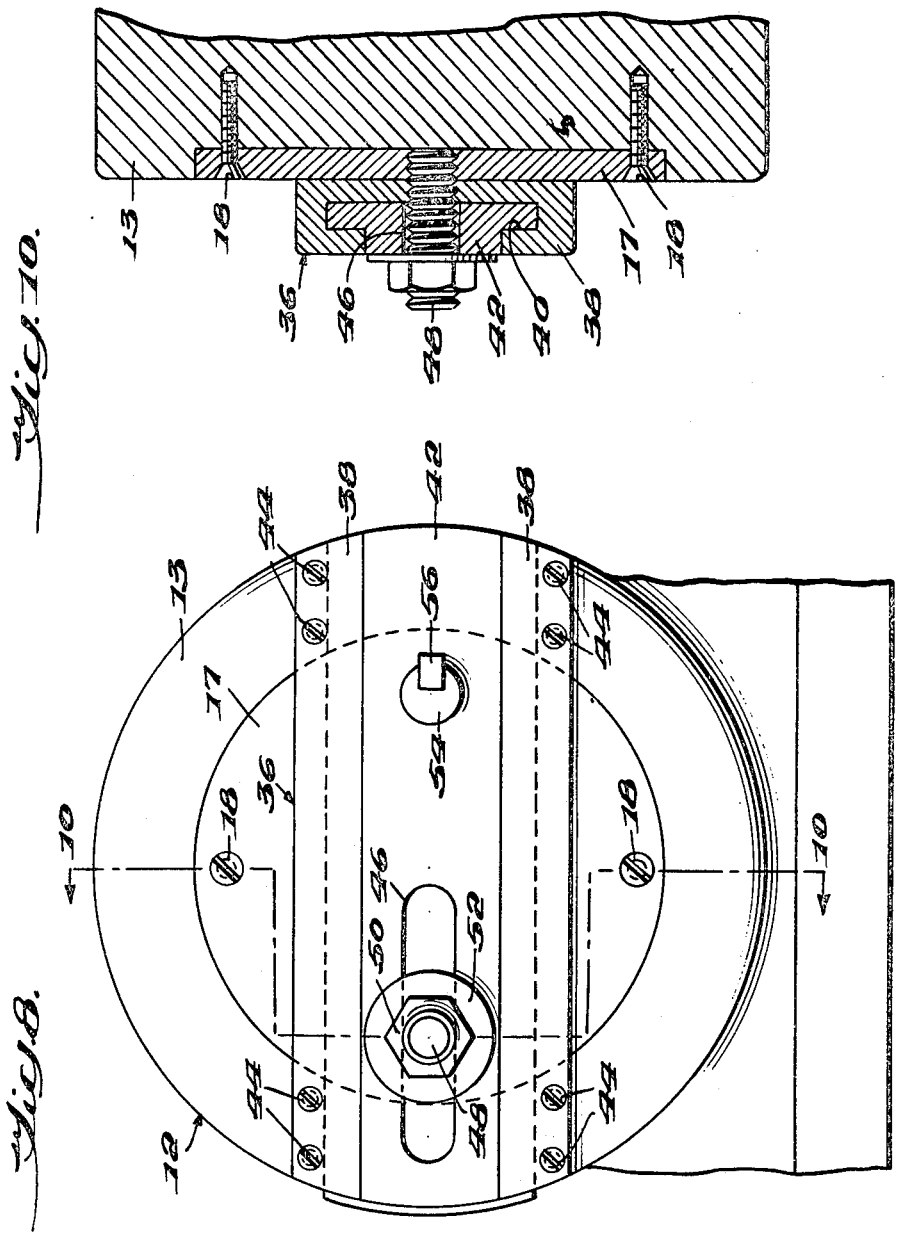

3,494,388
TURNING AND BORING HEAD
Vestal O. Sanders, 4802 Inskip Drive, Knoxville, Tenn. 37912, and Leonard C. Jenkins, Rte. 3, Powell, Tenn. 37849
Continuation-in-part of application Ser. No. 489,905, Sept. 24, 1965. This application June 8, 1967, Ser. No. 649,784
Int. Cl. B27c 5/00
U.S. Cl. 142—16                                14 Claims

ABSTRACT OF THE DISCLOSURE

A machine for forming ornamental and utilitarian shapes by means of a rotary head which cooperates with a cutter to produce objects of various shapes. The head is rotated by a drive shaft having an eccentric bearing member on which the head is journaled. A stationary gear mounted coaxially on the drive shaft cooperates with a ring gear mounted on the head to cause the head to follow a non-circular path. The gear ratio between the ring gear and the stationary gear determines the number of lobes in the non-circular path. The head may be used either as a turning head or a boring head. When used as a turning head, a workpiece is mounted on the head and a cutter is mounted adjacent the workpiece to cut away the material as the workpiece rotates. When used as a boring head, the cutter is mounted on the head and the workpiece is mounted on a stationary support adjacent the cutter, so that the material is cut away as the cutter advances into the workpiece.

RELATED APPLICATION

This application is a continuation-in-part of our copending application, Ser. No. 489,905, filed Sept. 24, 1965 and now abandoned, for Machines for Forming Various Ornamental Shapes.

BACKGROUND OF THE INVENTION

This invention relates to wood and metal turning and boring and, more particularly, to the shaping of various objects, by rotary motion between a cutter and a workpiece.

The formation of various non-circular shapes in metal and wood workpieces has been difficult and time consuming, as performed by conventional practices. Various machines have been developed for producing multiple lobular forms, such as elliptical forms which are generally bilobal, or triangular forms which are generally trilobal. These machines, however, are complex and therefore expensive to manufacture and operate.

One object of this invention is to simplify and improve machines for shaping objects from wood and other materials, especially objects that are made of multiple lobe forms, such as elliptical, trilobal, trochoidal and other shapes.

It is a further object of this invention to provide apparatus for machining workpieces into multiple lobe forms at high speeds and with close tolerances, but at relatively low cost.

Another object of the invention is to provide apparatus for producing various multiple lobe shapes.

A still further object of this invention is to provide a machine which is capable of producing multiple lobe forms either by a turning operation or by a boring operation.

SUMMARY OF THE INVENTION

These objects are accomplished, according to one embodiment of the invention, by providing a work holder mounted on a rotatable head which is driven by stationary gear and a ring gear and is supported on a bearing member fixed rigidly to a drive shaft so as to impart the desired degree of rotation to the head in turning in the same direction with respect to the shaft. The shape of the object may be varied by changing the gear ratio, and this may be accomplished easily, since the ring gear and stationary gear are readily removable from the head. The head has a face plate which extends in a plane at right angles to the axis of the drive shaft. The face plate is adapted to support either a work holder or a tool holder. When used as a turning head, the workpiece is mounted on the face plate and the cutter is mounted on the frame of the machine in position to engage the workpiece as it is rotated by the head. When used as a boring head, a cutter is mounted on the head by means of a tool holder, and the workpiece is secured in a fixture adjacent the head. As the head rotates, the tool moves in the path of the desired shape.

DESCRIPTION OF THE DRAWINGS

These preferred embodiments are illustrated in the accompanying drawings, in which:

FIG. 1 is a side elevational view, partially in cross section longitudinally through the machine;

FIG. 2 is a cross sectional view of the machine along the line 2—2 in FIG. 1;

FIG. 3 is a cross sectional view of the machine along the line 3—3 in FIG. 1;

FIG. 4 is an end elevational view of the machine showing the work holder;

FIG. 5 is a diagrammatic view illustrating various shapes that may be formed on the machine;

FIG. 6 is a top plan view, partially in cross section, showing the machine arranged as a boring head;

FIG. 7 is a diagrammatic view illustrating various trochoidal shapes that may be formed by the machine;

FIG. 8 is an end elevational view of the machine showing the tool holder;

FIG. 9 is a side elevational view of a portion of the machine showing the tool holder; and FIG. 10 is a cross sectional view of the tool holder along the line 10—10 in FIG. 8.

DESCRIPTION OF PREFERRED EMBODIMENTS

The embodiment of the invention illustrated in FIGS. 1 to 4 includes a suitable supporting structure, such as a table 1 upon which is mounted rigidly in secure relation a bed plate 2. The table 1 may serve also to mount and support the cutting apparatus here illustrated as a cutting tool C.

A drive shaft 3 is supported in bearings 4 mounted in pillow blocks 5 and 5′ on the bed plate 2. The drive shaft 3 may be rotated by suitable drive means, such as a pulley 6, mounted on the drive shaft and which is operated by a belt 7 extending from a suitable source of power, such as a motor.

The drive shaft 3 has one end thereof projecting outwardly from the pillow blocks 5 and 5′. The outer end of the drive shaft 3 has mounted thereon a bearing member 8 suitably secured in rigid relation to the drive shaft 3 in any customary or desired manner by keys, welding, etc. In the form of the invention illustrated, the welded connection is indicated at 9 which holds the bearing member 8 in proper relation to the drive shaft eccentrically thereof, as will be apparent from FIG. 3. This bearing member 8 is circular in cross section, having the opening 10 therethrough for the drive shaft 3 disposed eccentrically of the bearing member.

Surrounding the bearing member 8 are bearings 11 upon which is journaled a head 12. The head 12 is formed with a face plate 13 at one end of a cylindrical portion 14 mounted upon and extending between the bearings 11. At the opposite end of the head 12 from the face plate 13, this head is provided with a radially extending flange 15. A cylindrical recess 16 is thus formed between the face plate 13 and the flange 15.

The outer end of the head 12 is closed by a cover plate 17 extending over the end of the shaft 3 and the bearing member 8 and over the bearings 11 at that end. This cover plate is detachably secured to the face plate 13 of the head by suitable fastenings, such as screws 18.

At the opposite end of the head 12 there is secured thereto an internal ring gear 19 in abutting relation to the side face of the flange 15. This ring gear 19 is fixed securely and rigidly to the flange 15 by suitable fastenings, such as screws 20. The ring gear 19 extends around in planetary fashion a fixed spur gear 21 with which it is in mesh at one side, as illustrated in FIG. 2. The spur gear 21 is secured in stationary position and has a sleeve 22 fixed thereto, which sleeve is telescoped into the pillow block 5 to which it is secured rigidly against relative rotation by a set screw 23. Thus, the spur gear 21 will be held stationary while the shaft 3 is rotated relative thereto.

Extending over the gear and over the inner end of the head 12 is a cup-shaped cover, indicated generally at 24. The closed side of the cover 24 is indicated at 25 and covers the gears 21 and 19, as indicated in FIG. 1. This side 25 of the cover 24 is connected by suitable fastenings, such as screws or bolts 26, to the bearing member 8, being held spaced therefrom by sleeves 27 that surround the respective screws 26, and are interposed between the end of the bearing member 8 and the inner face of the side 25 of the cover. We have shown three of these fastening screws 26 spaced at intervals around the periphery of the spur gear 21, as illustrated in FIGS. 2 and 3, although any desired number may be used.

The cover 24 will rotate with the head 12 and it is noted that it encloses the peripheral side of the circumferential groove 16. Located within this groove 16 on the same side of the axis of the bearing member 8 on which the shaft 3 is disposed (see FIG. 3) is a counterweight 28. This counterweight 28 may be held in proper position relative to the head 12 in any suitable manner as, for example, by fastenings 29 that secure the counterweight to the adjacent portion of the cover 24. Inasmuch as the bearing member 8 is offset eccentrically of the shaft 3, the counterweight will always be on the opposite side of the axis of the shaft from the bearing member 8, and will balance the weight of the latter relative to the shaft in any position of turning movement.

Mounted upon the face plate 13 of the head 12 is a suitable work holder, generally indicated at 30 (see FIG. 4). While the work holder may be of any suitable or desired form and construction, we have shown as an example thereof in FIGS. 1 and 4 a work holder having a pair of grooved tracks 31 between which blocks 32 are mounted for relative sliding movement toward and from each other by a feed screw 33 journaled in a bearing 34 intermediate the length of the feed screw. The threaded end portions of the screw are threaded in opposite directions so as to feed the blocks from and toward each other upon rotation of the feed screw.

Mounted upon the respective blocks 32 are holding cups 35 against which the work W is secured. The work may be a block of wood, for example, or other suitable material which is held and manipulated while cutting tool C is fed into the work to produce the desired shape to the object.

In the operation of the machine, the shaft 3 is rotated so as to impart rotation to the bearing member 8, the cover 24 and the head 12. Inasmuch as the ring gear 19 will be turned with the rotation of the head and is in mesh with the stationary gear 21, this ring gear will cause the head 12 to be rotated in the same direction as the rotation of the shaft 3 and at an appreciably slower speed of turning movement. This will produce an orbital rotation of the head 12 around the axis of the shaft 3. With the cutter C held on a stationary axis, the work W will be moved through an orbit relative to the cutter corresponding with the orbit of turning movement of the head.

The gear ratio between the gears 19 and 21 will vary the shapes to be formed thereby. Some of the different shapes that may be produced on this machine, in addition to an elliptical shape, are illustrated in FIG. 5, being variations of a triangle with curved or straight sides. These have multiple lobes but usually will be the same on both sides of a bisecting plane.

For example, the machine may be used to turn an elliptical shape where the ratio between the gears 21 and 19 is 2 to 1. With the gear ratio between the gears 21 and 19, 2 to 3, a triangular shape may be formed, and this shape may be changed further to a triangular shape having concave or convex sides, as indicated in FIG. 5, by further shifting of the bearing member 8 circumferentially of the shaft 3 to one side or the other relative to the axis of the head. Thus, many variations in shapes may be formed on this machine by varying the gear ratios and the relative circumferential positions of these parts.

Referring now to the embodiment of the invention that is illustrated in FIGS. 6 to 10, the machine may be used as a boring head for producing various shapes on a workpiece mounted opposite the head 12. FIG. 6 is a top plan view of the machine which is rigidly mounted on the table 1. The machine includes the bed plate 2 which supports upright pillow blocks 5 and 5'. The drive shaft 3 is journaled for rotation in bearings mounted in the pillow blocks and power is transmitted to the drive shaft by the pulley 6 for rotating the shaft. This structure is substantially the same as that shown in FIG. 1.

The head 12 is mounted on the shaft 3 for rotation in various non-circular paths, as previously described. The work holder 30, as shown in FIG. 1, is replaced by a tool holder 36, as shown in FIGS. 8 to 10. The tool holder 36 includes a mounting block 38 which is provided with a T slot 40 for receiving a slide 42. The block 38 is secured to the base plate 13 by screws 44.

The slide 42 has a longitudinal slot 46. A stud 48 has one end rigidly secured in the block 38 and extends outwardly through the slot 46, as shown in FIGS. 8 and 10. A nut 50 is threaded on the end of the stud 48 to clamp a washer 52 between the nut 50 and the outer face of the slide 42. When the nut 50 is unscrewed to release the washer 52, the slide 42 may be displaced longitudinally relative to the block 38.

At the opposite end of the slide 42, a cutting tool holder 54 is rigidly secured in the slide 42. The holder that is shown in FIGS. 6, 8 and 9 is merely a schematic representation of a conventional tool holder having a hard cutting tool 56 mounted at the outer end of the holder. The position of the holder relative to the axis of rotation of the head 12 may be adjusted by means of the slot 46.

As shown in FIG. 6, a fixture 58 is rigidly mounted on the table 1 opposite the face plate 13. The fixture 58 supports a workpiece W rigidly in position to be engaged by the tool 56. For example, the fixture 58 may include a jaw type chuck for gripping the work W. The jaws 60 are movable laterally to adjust for various sizes of workpieces and to center the workpiece with respect to the rotational axis of the head 12. The work W may have a pilot hole 62 extending through the center of the work and movement of the cutter 56 relative to the work causes an internal cavity 64 to be machined in the work W. Conventional means, such as a lead screw 65, is provided for advancing the entire fixture 58 relative to the table 1, thereby advancing the cutter 56 relative to the work as cutting progresses. Of course, the fixture 58 may be held stationary, while the head 12 advances relative to the work W.

As shown in FIG. 7, various trochoidal shapes may be formed by boring into a workpiece with the cutter 56. The exact shape produced by the path of the cutter 56 depends not only on the gear ratio between the gears 21 and 19, but also upon the adjusted position of the cutter 56 with respect to the axis of the shaft 3. The shapes illustrated in FIG. 7 are produced by a head having the gears 21 and 19 in the ratio of 2 to 3. The series of cutting profiles 66, 68 and 70, illustrate various shapes produced merely by adjustment of the position of the cutting tool 56. In the arrangement illustrated in FIG. 8, the cutting tool 56 is offset along an axis approximately parallel to the position of maximum displacement of the head 12 with respect to the shaft 3. This orientation produces a shape as shown approximately by the profile 70, which produces a projection 72 during each rotation of the head 12. When the slide 42 is displaced toward the right, as viewed in FIG. 8, to the maximum extent permitted by the slot 46, the tool 56 follows the profile 66. The profile 68 represents the path of the tool 56 when the slide 42 is located at a position between the position shown in FIG. 8 and the position of maximum displacement.

A particular advantage of this machine is that the same apparatus may be used either for turning various lobular shapes by means of a separate cutting tool operating on the rotating workpiece, or the workpiece may be held stationary and the cutting tool may be mounted on the head for boring internal shapes in workpieces.

While this invention has been illustrated and described in several embodiments, it is recognized that variations and changes may be made therein without departing from the invention as set forth in the claims.

We claim:

1. In a machine for shaping material by cutting, the combination of a head having means on the head to support a workpiece thereon for shaping, a drive shaft extending into the head, a bearing member fixed to the drive shaft and journalled within the head and disposed eccentrically thereof substantially on one side of the shaft, a counterweight supported by the head and disposed substantially at the opposite side of the shaft from the bearing member, and means actuated by rotation of the shaft for turning the head in the same direction as the drive shaft upon rotation of the shaft.

2. In a machine according to claim 1 wherein said turning means includes a ring gear fixed to the head, and a stationary gear in mesh with the ring gear for causing rotary movement of the head in the same direction as the shaft upon rotation of the shaft.

3. In a machine according to claim 2 including means for detachably securing the ring gear to the head for rotating the head upon turning the ring gear.

4. In a machine according to claim 3 including a cover detachably mounted on the bearing member to rotate therewith.

5. In a machine for shaping material by cutting, the combination of a drive shaft, a bearing member mounted on and fixed to the drive shaft eccentrically thereof, a head journalled on the bearing member for rotation relative thereto, a face plate on one end of the head having means for supporting work, a ring gear at the opposite end of the head, means for detachably mounting the ring gear on the head, a stationary gear in mesh with the ring gear, means for rotating the drive shaft to cause turning movement of the head in the same direction thereto.

6. In a machine according to claim 5 including holder means mounted in opposing relation to said face plate, cutter means, means for selectively mounting a workpiece between said holder means and said face plate, and means for mounting said cutter means in position to engage a workpiece held by said mounting means, whereby rotation of said head causes relative movement between said workpiece and said cutter for operation either as a turning head or a boring head.

7. In a machine according to claim 6, said mounting means including means on said holder means for securing said cutter means thereon and means on said face plate for mounting a workpiece.

8. In a machine according to claim 6, said mounting means including means on said face plate for securing said cutter means thereon and means on said holder means for mounting a workpiece.

9. In a machine according to claim 6 wherein said bearing member has a cylindrical bearing surface, said bearing surface having a central axis substantially parallel to and spaced from the central axis of said driveshaft.

10. In a machine according to claim 6 wherein said ring gear and said stationary gear have cooperating gear teeth, the number of teeth of said ring gear and the number of teeth of said stationary gear being in the ratio of 3 to 2, whereby said head follows a trilobal path.

11. In a machine for shaping material by cutting, the combination of a drive shaft, a bearing member mounted on and fixed to the drive shaft eccentrically thereof, a head journaled on the bearing member for rotation relative thereto, a face plate on one end of the head, a ring gear at the opposite end of the head, means for detachably mounting the ring gear on the head, a stationary gear in mesh with the ring gear, means for rotating the drive shaft to cause turning movement of the head in the same direction thereto, holder means mounted in opposing relation to said face plate, cutter means, means for selectively mounting a workpiece between said holder means and said face plate, and means for mounting said cutter means in position to engage a workpiece held by said mounting means, whereby rotation of said head causes relative movement between said workpiece and said cutter for operation either as a turning head or a boring head, said bearing member having a cylindrical bearing surface, said bearing member having a central axis substantially parallel to and spaced from the central axis of said driveshaft, said head including a sleeve having an internal cylindrical surface, said sleeve being mounted coaxially on said bearing member surface, said face plate being secured on said sleeve.

12. In a machine according to claim 11 including means for securing said ring gear on said sleeve, said ring gear and said sleeve surface having a common central axis.

13. In a machine according to claim 12, wherein said stationary gear is mounted coaxially on said drive shaft.

14. In a machine according to claim 12 including means for temporarily securing said ring gear on said sleeve, and temporarily mounting said stationary gear in said head.

References Cited

UNITED STATES PATENTS

| 167,614 | 9/1875 | Koch et al. | 82—18 XR |
| 222,901 | 12/1879 | Heckendorn | 142—16 |
| 2,762,250 | 9/1956 | Auman et al. | 82—18 |
| 3,165,130 | 1/1965 | Sanders | 142—16 XR |

LEONIDAS VLACHOS, Primary Examiner

U.S. Cl. X.R.

82—18; 77—3